United States Patent
Wood et al.

(10) Patent No.: US 8,429,671 B2
(45) Date of Patent: Apr. 23, 2013

(54) INTEGRATED WORKFLOW BUILDER FOR DISPARATE COMPUTER PROGRAMS

(75) Inventors: Stephen B. Wood, Spring, TX (US); Neal Adair, Sugar Land, TX (US); Don J. Daniels, Jr., Spring, TX (US); Rune Musum, Stavanger (NO)

(73) Assignee: ExxonMobil Upstream Research Company, Houston, TX (US)

(*) Notice: Subject to any disclaimer, the term of this patent is extended or adjusted under 35 U.S.C. 154(b) by 275 days.

(21) Appl. No.: 12/871,584

(22) Filed: Aug. 30, 2010

(65) Prior Publication Data

US 2011/0093864 A1 Apr. 21, 2011

Related U.S. Application Data

(60) Provisional application No. 61/253,725, filed on Oct. 21, 2009.

(51) Int. Cl.
*G06F 9/44* (2006.01)

(52) U.S. Cl.
USPC .......................................................... 719/313

(58) Field of Classification Search .................. 719/310, 719/311, 312, 313; 702/13; 703/10; 707/608; 705/7.27, 301
See application file for complete search history.

(56) References Cited

U.S. PATENT DOCUMENTS

| | | | |
|---|---|---|---|
| 5,321,612 A * | 6/1994 | Stewart ........................... | 702/13 |
| 6,115,646 A | 9/2000 | Fiszman et al. | |
| 6,208,345 B1 | 3/2001 | Sheard et al. | |
| 6,434,594 B1 | 8/2002 | Wesemann | |
| 6,782,508 B1 | 8/2004 | Bahrs et al. | |
| 6,975,914 B2 | 12/2005 | DeRemer et al. | |
| 6,990,636 B2 | 1/2006 | Beauchamp et al. | |
| 7,080,092 B2 * | 7/2006 | Upton ................................. | 1/1 |
| 7,174,230 B2 | 2/2007 | Aarackaparambil et al. | |
| 7,184,967 B1 | 2/2007 | Mital et al. | |
| 7,203,929 B1 * | 4/2007 | Vinodkrishnan et al. ..... | 717/124 |
| 7,225,425 B2 | 5/2007 | Kompalli et al. | |
| 7,277,796 B2 * | 10/2007 | Kuchuk et al. .................... | 702/7 |
| 7,281,213 B2 | 10/2007 | Callegari | |
| 7,298,376 B2 | 11/2007 | Chuter | |
| 7,337,409 B2 | 2/2008 | Doblmayr et al. | |
| 7,343,605 B2 | 3/2008 | Langkafel et al. | |
| 7,409,438 B2 | 8/2008 | McConnell et al. | |
| 7,467,045 B2 * | 12/2008 | Tabanou et al. ................. | 702/13 |
| 7,596,480 B2 * | 9/2009 | Fung et al. ...................... | 703/10 |
| 7,616,213 B2 | 11/2009 | Chuter | |
| 7,925,695 B2 | 4/2011 | McConnell et al. | |
| 2002/0059517 A1 | 5/2002 | Haviv et al. | |
| 2003/0055668 A1 | 3/2003 | Saran et al. | |

(Continued)

*Primary Examiner* — Van Nguyen
(74) *Attorney, Agent, or Firm* — ExxonMobil Upstream Research Company Law Department

(57) ABSTRACT

A method of communicating between hydrocarbon management-related computer programs having non-identical data formats. Tools associated with each of the computer programs are obtained. Each tool represents a functionality of its respective computer program. Representations of the tools are displayed in a toolbox. A plurality of the displayed representations are selected such that the displayed representations are placed in a displayed workspace to establish a graphical representation of a workflow. Displayed representations from more than one computer program are selected. The displayed representations are positioned in the graphical representation of the workflow in a sequence corresponding to a desired workflow sequence. The workflow is executed according to the desired workflow sequence. Inter-program communications is facilitated between the computer programs to enable the workflow to execute by transferring messages and data between the computer programs in a common data format.

21 Claims, 16 Drawing Sheets

U.S. PATENT DOCUMENTS

| | | |
|---|---|---|
| 2004/0078373 A1 | 4/2004 | Ghoneimy et al. |
| 2006/0074734 A1 | 4/2006 | Shukla et al. |
| 2006/0190544 A1 | 8/2006 | Chikirivao et al. |
| 2006/0253540 A1 | 11/2006 | Hughes |
| 2007/0112547 A1* | 5/2007 | Ghorayeb et al. .............. 703/10 |
| 2007/0156878 A1 | 7/2007 | Martin et al. |
| 2007/0157088 A1 | 7/2007 | Lewis-Bowen et al. |
| 2007/0266082 A1 | 11/2007 | McConnell et al. |
| 2008/0055257 A1 | 3/2008 | Peng |
| 2008/0222192 A1 | 9/2008 | Hughes |
| 2009/0125362 A1* | 5/2009 | Reid et al. ......................... 705/8 |
| 2010/0084131 A1* | 4/2010 | Bouzas et al. ........... 166/250.15 |

* cited by examiner

INTEGRATED WORKFLOW BUILDER FOR DISPARATE COMPUTER PROGRAMS

CROSS REFERENCE TO RELATED APPLICATION

This application claims the benefit of U.S. Provisional Patent Application 61/253,725, filed Oct. 21, 2009, entitled Integrated Workflow Builder, the entirety of which is incorporated by reference herein.

TECHNICAL FIELD

Disclosed aspects relate to integrating computer programs, and more specifically, to using disparate computer programs together.

BACKGROUND OF THE DISCLOSURE

This section is intended to introduce various aspects of the art, which may be associated with aspects of the disclosed techniques and methodologies. A list of references is provided at the end of this section and may be referred to hereinafter. This discussion, including the references, is believed to assist in providing a framework to facilitate a better understanding of particular aspects of the disclosure. Accordingly, this section should be read in this light and not necessarily as admissions of prior art.

One function of computer programs is to modify or create new data based on algorithms. Computer program data integration involves moving data from one computer program into another computer program. In its simplest form, this involves copying data from one computer program into another computer program manually via the computer's internal clipboard. This operation may be known as "copy and paste". To copy and paste data, a person manually selects the data to be copied from a first computer program, instructs the computer to copy the data, opens up a second computer program, and manually pastes the copied data into the second program. Manually copying and pasting data between computer programs is time-consuming and error-prone. Additionally, it often involves manually reformatting the data before being pasted into the second computer program. Sometimes data sets are too large to fit inside the computer's internal clipboard, and the copy and paste operation isn't even feasible.

Another form of data integration exports and/or imports a data file. Some computer programs can export data into a file. A person selects the data to be exported from a first computer program and manually instructs the first computer program to export the data into a file. The person goes to the second computer program and instructs the second computer program to import the file. This type of integration requires that the computer programs understand each other's data formats, or in other words, the computer programs must have data formats compatible with each other.

A computer program may be designed to store data in a specific data format to optimize execution speed or to comply with the purposes of the program itself. Typically data formats are designed to represent concrete world objects or concepts, either of which may be known as data objects. In practice, computer programs that are designed to work together may share similar types of data objects. For example, two different computer programs for managing a company payroll are shown in FIG. 1. The first computer program A includes an employee data set 12 that has three data objects 13, 14, 15 representing an employee's name, address, and phone number, respectively. The second computer program B includes an employee data set 16 that has four data objects 17a, 17b, 18, 19 representing an employee's first name, last name, address, and phone number, respectively. Although the data objects in the two computer programs are similar, the first computer program will most likely store data relating to its data objects in a different binary code format and organization than the second computer program. Therefore, directly integrating data between the two computer programs may be problematic.

One solution might be to modify the computer application associated with each computer program to understand another computer program's data format. For example, if the computer application associated with second computer program B was open source, the computer application could be modified to understand first computer program A's data format, thereby enabling communication between the two computer programs. Such modification is called a data format adapter, and is shown in FIG. 2 at reference number 22. Another data format adapter 24 would be required for first computer program A to understand second computer program B's data format. Data format adapters would be required for every data object the first and second computer programs might share. Creating unique data format adapters for each computer program's native data format is inflexible to change. Occasionally computer programs change their data formats, and other programs then would need to upgrade their data format adapters to respond to the format change. The problem gets more complicated when data from more than two computer programs are desired to be integrated. For integrating data from two computer programs would require two data format adapters, but integrating data from four computer programs having different data formats would require twelve data format adapters. In an environment with N computer programs, $N(N-1)$ data format adapters are required for full data integration. Creating even a single data format adapter for a computer program for a set of domain objects represents a nontrivial amount of work for a computer programmer. The updating process itself can be a time-consuming and labor-intensive task. Furthermore, creating and updating data format adapters may be hampered significantly if the computer application associated with any of the computer programs is closed source.

A less common type of computer program integration involves executing computer algorithms in an ordered sequence. For example, adding two variables X and Y together is a very simple algorithm that may be called 'Add2Numbers' and reside in computer program A. Computer program B could have an algorithm called 'SquareANumber' that takes a number and squares it ($n^2$). It may be desired to run 'Add2Numbers' and then run 'SquareANumber'. This may require a user to first manually interact with computer program A and then with computer program B. In a more automated and integrated environment, 'Add2Numbers' and 'SquareANumber' could be executed sequentially with no manual interaction. This type of real-time computer program integration is helpful in automating how several computer programs should interact together in real-time as they execute. Combining algorithmic integration with data integration can truly integrate the capabilities of several programs at once. However, the challenges of potentially different data formats may remain. What is needed is a way to enable computer programs to easily share and manipulate data with a minimum amount of modification.

SUMMARY

In one aspect, a method of communicating between a first computer program and a second computer program is provided. The first and second computer programs are configured to perform hydrocarbon management activities and have non-identical data formats. At least one tool associated with the first computer program and at least one tool associated with the second computer program are obtained. Each tool represents a functionality of the computer program with which it is associated. A representation of the at least one tool associated with the first computer program and the at least one tool associated with the second computer program are displayed in a toolbox. A plurality of the displayed representations are selected such that the displayed representations are placed in a displayed workspace to establish a graphical representation of a workflow. Displayed representations from more than one computer program are selected. The displayed representations are positioned in the graphical representation of the workflow in a sequence corresponding to a desired workflow sequence. The workflow is executed according to the desired workflow sequence. A third computer program is employed to facilitate inter-program communications between the first and second computer programs to enable the workflow to execute. The third computer program transfers messages and data between the first and second computer programs in a common data format.

According to methodologies and techniques, the first and second computer programs may communicate with each other through the third computer program using messages that include an action portion and a data portion. The first and second computer programs may communicate anonymously through the third computer program. The first computer program may translate data from its native data format to the common data format before sending the data to the second computer program, and the first computer program may translate received data from the common data format to its native data format. At least one of the first computer program and the second computer program may use a plug-in to translate the data from its respective data format to the common data format or from the common data format to its respective native data format. The first computer program, the second computer program, and the third computer program may be executed on a single computer. The first computer program may be executed on a computer that is different from a computer on which at least one of the second and third computer programs are executed. A representation of a common tool may be displayed in the toolbox, wherein the common tool is associated with functionality that is not unique to the first computer program or the second computer program, and wherein the representation of the common tool is configured to be selected and positioned in the graphical representation of the workflow. The representation of at least one tool may include a graphical icon. The representation of at least one tool may include text. The first computer program may be a reservoir simulation program, and the second computer program may have an output that is used as an input to the reservoir simulation program. The output may be at least one of well placement data, well trajectory data, hydraulic pressure, model geometry, model properties, geometric data, surfaces, seismic, and financial data. The first computer program may be a reservoir simulation having an output that is used as an input to the second program.

In another aspect, a method of communicating between a plurality of computer programs is provided. Each of the plurality of computer programs is configured to perform hydrocarbon management activities. At least one tool associated with each of the plurality of computer programs is obtained. Each tool represents a functionality of the computer program with which it is associated. A representation of the at least one tool associated with each of the plurality of computer programs is displayed in a toolbox. A plurality of the displayed representations are selected such that the displayed representations are placed in a displayed workspace to establish a graphical representation of a workflow. Displayed representations from more than one of the plurality of computer programs are selected. The displayed representations are positioned in the graphical representation of the workflow in a sequence corresponding to a desired workflow sequence. The workflow is executed according to the desired workflow sequence. Inter-program communications is facilitated between any of the plurality of computer programs to enable the workflow to execute. The facilitating is performed by transferring messages between the computer programs in a common data format.

According to methodologies and techniques, facilitating inter-program communications may be accomplished using an inter-program communications computer program. A representation of a common tool may be displayed in the toolbox. The common tool may be associated with functionality that is not unique to any of the plurality of computer programs. The representation of the common tool may be configured to be selected and positioned in the graphical representation of the workflow. The representation of at least one tool may include at least one of a graphical icon and text. One of the plurality of computer programs may be a reservoir simulation program, and another of the plurality of computer programs may receive an input from or send an output to the reservoir simulation program. The input or output may be at least one of well placement data, well trajectory data, hydraulic pressure, model geometry, model properties, geometric data, surfaces, seismic, reservoir simulation data, and financial data.

In another aspect, a computer program product is provided having computer executable logic recorded on a tangible, machine readable medium. The computer program product includes: code for obtaining at least one tool associated with a first computer program and at least one tool associated with a second computer program, wherein each tool represents a functionality of the computer program with which it is associated, and wherein the first and second computer programs are configured to perform hydrocarbon management activities and have non-identical data formats; code for generating a representation of the at least one tool associated with the first computer program and the at least one tool associated with the second computer program; code for displaying the generated representations in a toolbox; code for placing selected displayed representations in a displayed workspace to establish a graphical representation of a workflow, wherein displayed representations from more than one computer program are selected, and wherein the displayed representations are positioned in the graphical representation of the workflow in a sequence corresponding to a desired workflow sequence; code for executing the workflow according to the desired workflow sequence; and code for enabling inter-program communications between the first and second computer programs to enable the workflow to execute such that messages and data are transferred between the first and second computer programs in a common data format.

In another aspect, a method of hydrocarbon management is provided. According to the method, a first computer program is accessed that performs a hydrocarbon management activity. The first computer program has a first data format. A second computer program is accessed that performs a hydrocarbon management activity. The second computer program has a second data format. At least one tool associated with the first computer program and at least one tool associated with the second computer program are obtained. Each tool represents a functionality of the computer program with which it is associated. Representations of the at least one tool associated with the first computer program and the at least one tool associated with the second computer program are displayed in a toolbox. A plurality of the displayed representations are selected such that the displayed representations are placed in a displayed workspace to establish a graphical representation of a hydrocarbon management workflow. Displayed representations from more than one computer program are selected. The displayed representations are positioned in the graphical representation of the hydrocarbon management workflow in a sequence corresponding to a desired workflow sequence. The hydrocarbon management workflow is executed according to the desired workflow sequence. A third computer program is employed to enable inter-program communications between the first and second computer programs to enable the hydrocarbon-related workflow to execute. The third computer program transfers messages and data between the first and second computer programs in a common data format. Hydrocarbons are managed based on an output of the hydrocarbon management workflow.

BRIEF DESCRIPTION OF THE DRAWINGS

The foregoing and other advantages may become apparent upon reviewing the following detailed description and drawings of non-limiting examples of embodiments in which.

Figure 1:
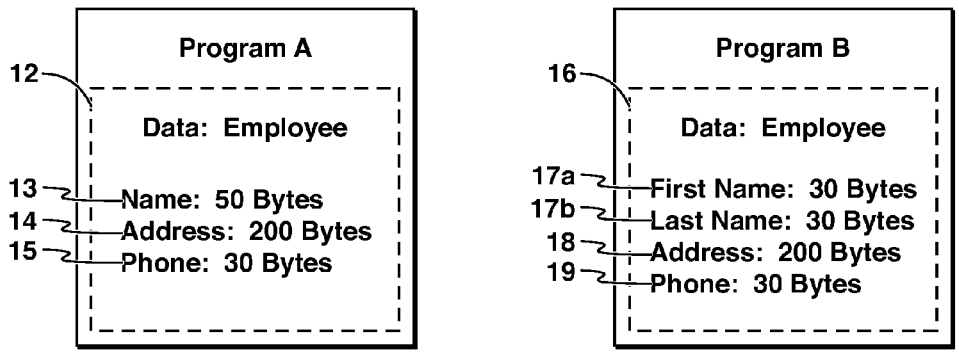
FIG. 1 is a block diagram of two computer programs.
Figure 2:
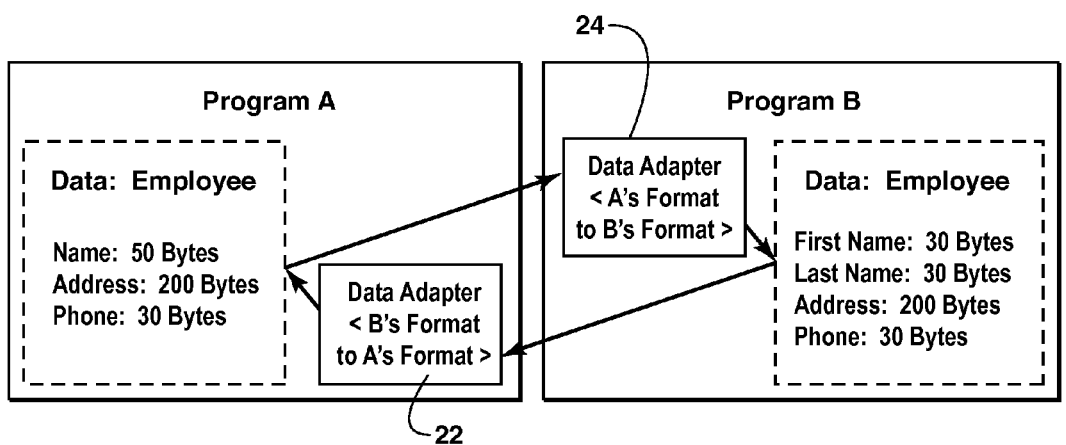
FIG. 2 is a block diagram of two computer programs communicating using data adapters.

To the extent the following detailed description is specific to a particular embodiment or a particular use of the disclosed techniques, this is intended to be illustrative only and not to be construed as limiting the scope of the invention. On the contrary, it is intended to cover all alternatives, modifications and equivalents that may be included within the spirit and scope of the invention, as defined by the appended claims.

DETAILED DESCRIPTION

Some portions of the detailed description which follows are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as "obtaining", "representing", "displaying", "selecting", "placing", "establishing", "positioning", "executing", "employing", "facilitating", "transferring", "enabling", "communicating", "including', "translating", "sending", "using", "associating with", "outputting", "generating", "accessing", and "managing", or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable transmission medium, for transmitting signals such as electrical, optical, acoustical or other form of propagated signals (e.g., carrier waves, infrared signals, digital signals, etc.).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

As used herein, "computer algorithm" is a set of logical commands that a computer executes.

As used herein, "computer program" or "program" is a process that runs inside of the volatile memory of a computer. Computer programs have algorithmic logic and data stored in a binary format. As used in the discussion herein, a computer program does not exist when the computer is dormant and not yet loaded into the volatile memory of a computer. For example, a word processor exists initially on a computer's hard drive as a computer application. When a computer user double-clicks on an on-screen icon representing the word processor, a new computer program is started by compiling and/or executing the computer application associated therewith. When the user exits the word processor the computer program ends. A user can open the word processor twice at the same time, and this would constitute two different running computer programs because each would have its own data and volatile memory assigned thereto. For the purpose of describing aspects of the disclosed techniques, a computer program only exists if all or part of it is executing currently in a computer's volatile memory. (FIG. 1)

As used herein, "computer application" or "application" is the information necessary to create a running computer program. A computer application is dormant and is retained on a computer's hard drive or other storage device.

As used herein, "volatile memory" refers to memory associated with a computer in which a compiled or executing computer program is stored during execution. Random Access Memory (RAM) is an example of volatile memory.

As used herein, "source" refers to human readable language used to create a computer application.

As used herein, "open source" refers to source that can be modified by a user, thus potentially modifying the behavior of the associated computer program.

As used herein, "closed source" refers to source that cannot be accessed and/or modified by a user. A computer application may be open source for its owners but closed source for everyone else.

As used herein, "clipboard" refers to a portion of computer memory reserved for temporarily storing data. "Clipboard" may include other means of storing data intended to be available for transfer from one computer program to another computer program.

As used herein, "data format adapter" refers to logic that converts a data format so that data from a first computer program can be understood by a second computer program. A data format adapter may comprise modifications to source code in a computer application associated with a computer program.

As used herein, "plug-in" is a computer program that, when executed, becomes part of another computer program.

As used herein, "real time" refers to the idea that computer programs don't need manual intervention from a human to communicate and can negotiate data sharing without stopping and waiting for human assistance. The computer programs can communicate directly and share data between themselves.

As used herein, a "workflow" is an ordered sequence of tools.

As used herein, a "tool" represents algorithms and/or logic that can be executed by a computer program and which may be embodied in a machine-readable medium as a set of instructions.

As used herein, a "toolbox" is a collection of tools.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, "hydrocarbon reservoirs" include reservoirs containing any hydrocarbon substance, including for example one or more than one of any of the following: oil (often referred to as petroleum), natural gas, gas condensate, tar and bitumen.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, optimizing field depletion, and any other hydrocarbon-related acts or activities.

As used herein, "machine-readable medium" refers to a medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

As used herein, "subsurface" means beneath the top surface of any mass of land at any elevation or over a range of elevations, whether above, below or at sea level, and/or beneath the floor surface of any mass of water, whether above, below or at sea level.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Aspects of the disclosed methodologies and techniques include an integrated workflow builder that enables communication and interaction between disparate computer programs. The integrated workflow builder includes, but is not limited to, three components or concepts: a common data model, program-to-program (P2P) communications, and a uniform resource identifier (URI). Each of these components or concepts will be described in an example context of a plurality of human resources—related computer programs. However, the components and concepts described herein may be used with other types of computer programs, such as hydrocarbon management activities.

Common Data Model

Figure 3:
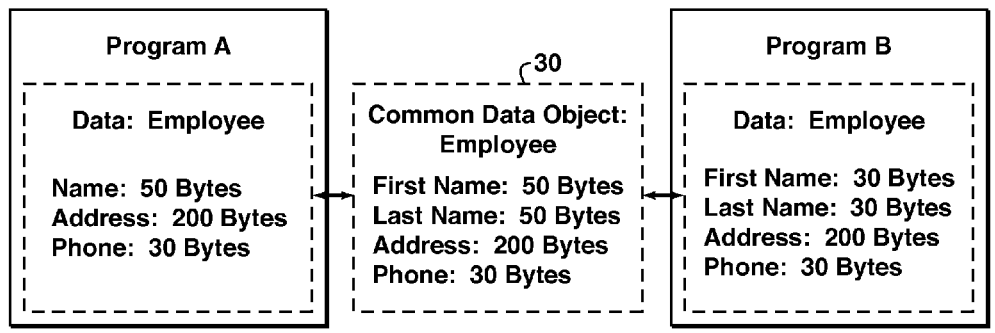
FIG. 3 is a block diagram of two computer programs and a common data object.

The Common Data Model combines similar data objects from different computer programs into a common data object. For example, in FIG. 1 the data objects in computer program A and computer program B describe similar subjects but have different formats. However, for the example of managing a company payroll, because the data objects relating to an employee's identity are very similar in the two computer programs, it may be possible to extract similar data objects from the computer programs and combine them into a common data object, as shown at reference number 30 in FIG. 3. While some data may be unique or exclusive to a computer program and would not be included as part of a common data object, many data objects in computer programs may be formatted using a common data object.

Figure 4:
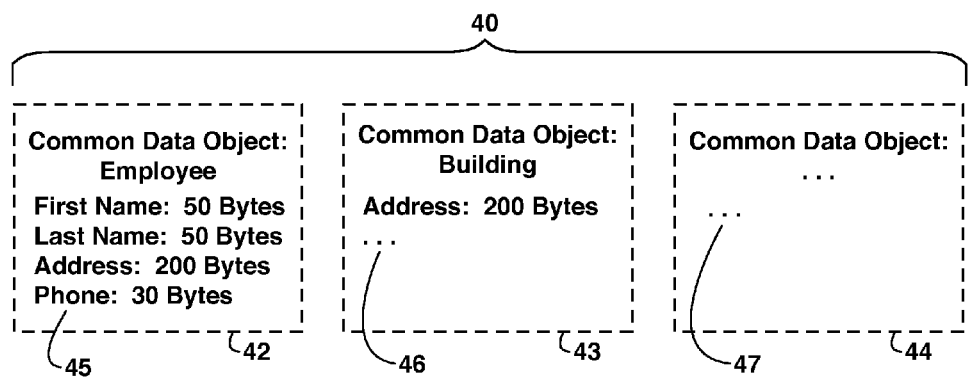
FIG. 4 is a block diagram of a common data model.

Continuing the example of computer programs that manage payroll, the computer programs may have been programmed to have a different concept of an employee, job type, work location, etc. Each of these concepts could be represented with a common data object and the entire set of common data objects would compose a Common Data Model, an example of which is shown at reference number 40 in FIG. 4. The common data model 40 includes a first common data object 42 relating to an employee and a second data object 43 relating to a building in which employees may work. Additional common data objects are represented at 44. Each common data object has one or more data sets 45, 46, 47 that are established to represent common data from different payroll computer programs.

Figure 5:
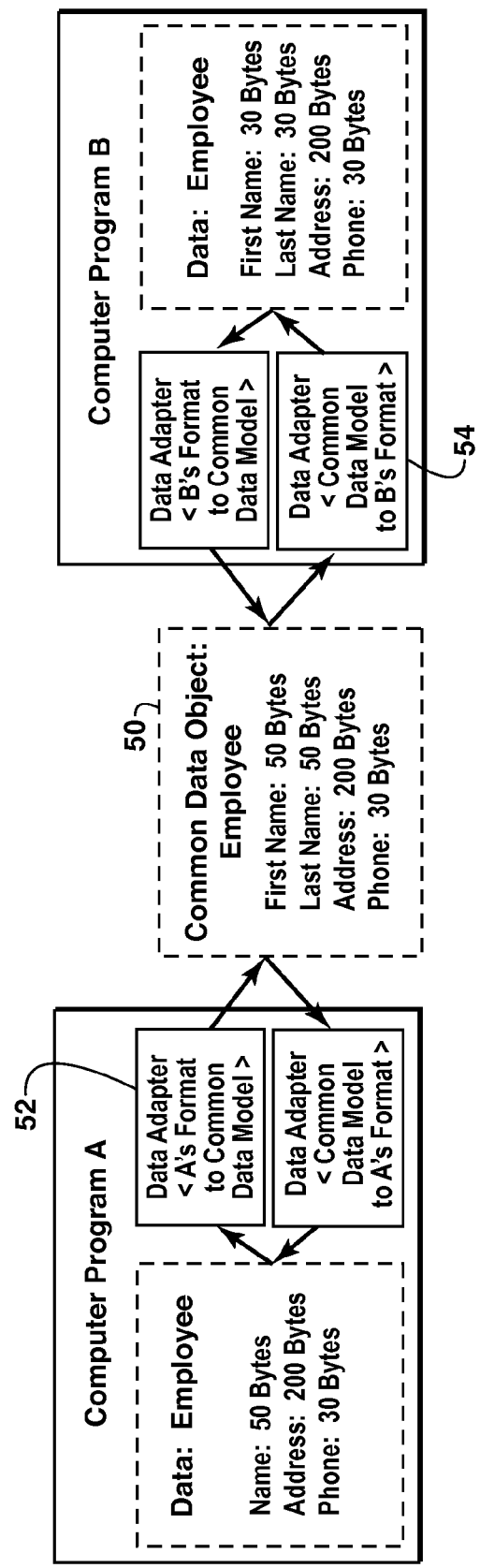
FIG. 5 is a block diagram of two computer programs communicating using a common data object.

The Common Data Model eliminates a large amount of work and creates a flexible environment for computer programs to share data in real-time. In the payroll example, with a common data model for the payroll domain depicted in FIG. 5, one common data object 50 could be called 'employee'. When computer program A needs to move data for an employee to computer program B, computer program A will not send the employee data in the native data format of computer program A, but will instead convert the employee data into the common data object format using a first Common Data Model adapter 52. Computer program B then will receive the employee data in the common data object format as sent by computer program A. Computer program B then converts the data into its own data format using a second Common Data Model adapter 54.

Figure 6:
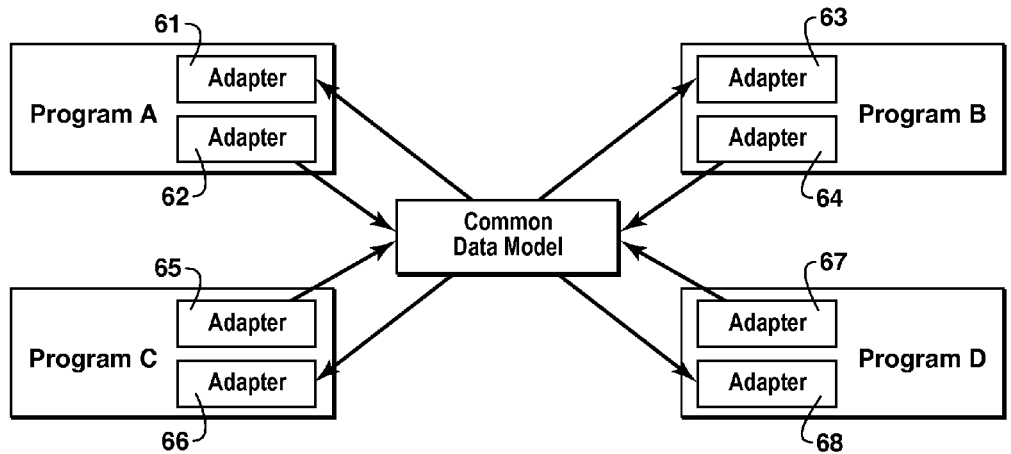
FIG. 6 is a block diagram of four computer programs communicating using data adapters.

By using the Common Data Model, computer programmers don't have to do as much work to get computer programs to share data. Each computer program requires just two common data adapters to communicate with any other computer program using the Common Data Model. Rather than having to create N(N−1) data format adapters (where N is the number of computer programs to share data), a system of computer programs needs only a maximum of N*2 adapters for reading and writing data. As shown in FIG. 6, four independent computer programs only require eight common data model adapters 61-68 instead of 12 adapters according to previously known methods. In the case of eight computer programs, only 16 adapters are required, compared with 56 adapters according to the previously known methods. Additionally, computer programs are insulated from change when the data format of one of the computer programs is changed; instead of all computer programs needing to be modified, only the adapters associated with the changed computer program may need to be modified. Computer programs will not have to be aware of other programs, and they can be independent of each other. New computer programs added to the environment present no additional overhead to the existing computer programs already in the environment and won't add any additional work. By using the common data model, computer programs can share data flexibly between themselves in real-time.

Program-to-Program (P2P) Communication

Figure 7:
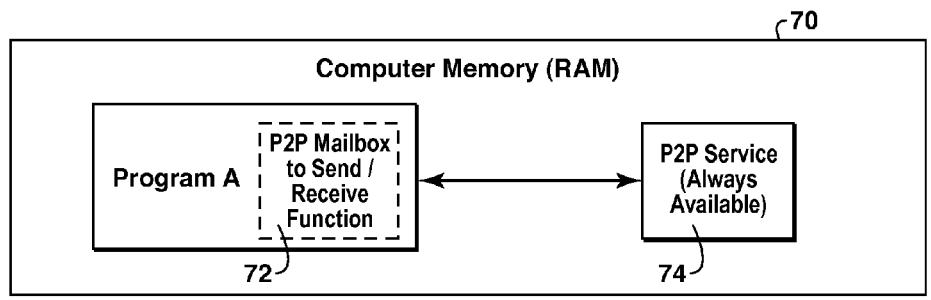
FIG. 7 is a block diagram of a computer memory having a computer program and the Program-to-program (P2P) service running thereon.

Program-to-Program (P2P) is a computer program that enables generic, real-time communications between computer programs. P2P leverages the transmission control protocol/internet protocol (TCP/IP) or other network communication protocols as well as simple file sharing via shared directories. As a computer program, P2P runs as a service on a computer. This means that P2P can begin to execute as soon as a computer is turned on and can continue to execute until the computer is turned off. P2P can be configured to be always on and available to other computer programs running on the same machine. To communicate with other computer programs via P2P, a computer program registers itself with P2P. A computer program registering with P2P should be able to receive messages from P2P, and specifically, the computer program should provide a basic type of inbox or message receiving function to receive messages from other members. A computer program satisfying these criteria can be considered a P2P member, or in other words, a member of a P2P network. FIG. 7 schematically depicts a computer memory 70 in which computer program A is running. Computer program A has established a message send/receive function 72 configured to send and/or receive messages to and/or from other computer programs that are P2P members. The P2P service 74 is also running in computer memory 70. Computer program A registers as a P2P member with P2P service 74. When a P2P member sends a message to another P2P member, the sending member is not aware of the details of the receiving member. In fact, little information is known by a P2P member about other P2P members besides the ability to send or receive messages. The anonymity of a P2P member makes the communication environment of P2P very generic and extendable. Diverse computer programs can all communicate with each other in real-time even though the computer programs might differ drastically in their functionality. Computer programs that are P2P members can even be written in different computer languages but will still be able to send understandable messages to each other. This is because the actual messages being sent are text messages, which is something virtually all computer programs can recognize. Specifically, the messages that P2P members send to each other may be packaged in extended mark-up language (XML) or other protocol that transmits text.

Figure 8:
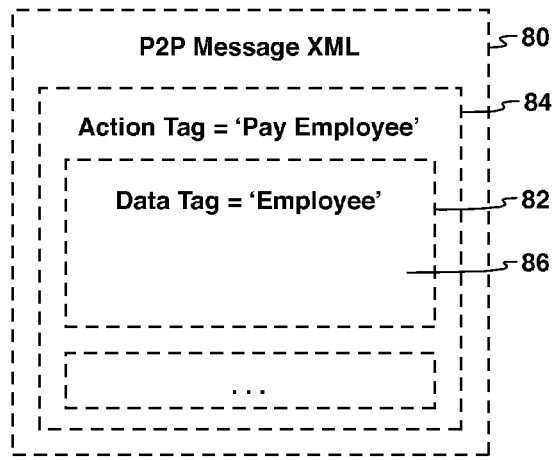
FIG. 8 is a block diagram of a P2P message.

XML can be considered text that contains tags and data. The tags surround and describe the data in an XML message. P2P members use the tags to determine how to use the data surrounded by the tags. The tags are standardized and known/recognized between computer programs that are P2P members. FIG. 8 depicts a P2P message 80 in which the two basic kinds of tags are shown: a data tag 82 and an action tag 84. A P2P message can comprise multiple data tags and action tags. Data tag 82 is defined by the previously-discussed Common Data Model. Using the payroll example, data tag 82 could be named 'Employee', which would mean that the data 86 inside the data tag defines an Employee in the Common Data Model format. An action tag such as action tag 84 contains instructions to perform a function or routine, and specifically, it denotes what operation is to be done with an associated data tag. Receiving the action tag denotes that the receiving P2P member should execute the algorithm corresponding to the message. As shown in FIG. 8, action tag 84 could be named 'PayEmployee'. The P2P member running the PayEmployee algorithm would need to know which employee to pay. The XML tag 'PayEmployee' therefore includes a data tag, such as the data tag 82 named 'Employee', that contains the Common Data Model definition for an Employee data object. A receiving P2P member would receive a P2P message containing the 'PayEmployee' action tag 84 and the associated 'Employee' data tag 82.

The integrated environment as disclosed herein defines a standard Common Data Model XML tag. The data tag 'Employee' would be of this type. The Common Data Model XML tag can be used to represent every type of Common Data Object in the Common Data Model. The integrated environment also defines a standard set of XML action tags for sending and receiving data or for sending and receiving catalogs describing the data a member is willing to share with other members. For example, an action tag titled 'RemitAvailableData' is understood as a request to provide a list or catalog of data a receiving P2P member is willing to share with other P2P members. Each P2P member is aware of the Common Data Model XML tag and the standard set of XML action tags that relate to sharing data. Members don't necessarily have to respond to the standard data sharing P2P messages.

Figure 9A:
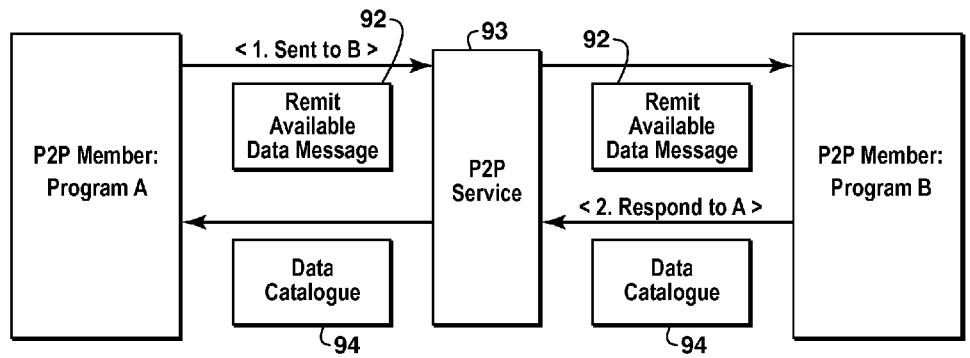
FIGS. 9A and 9B are block diagrams of two computer programs communicating using the P2P service.
Figure 9B:
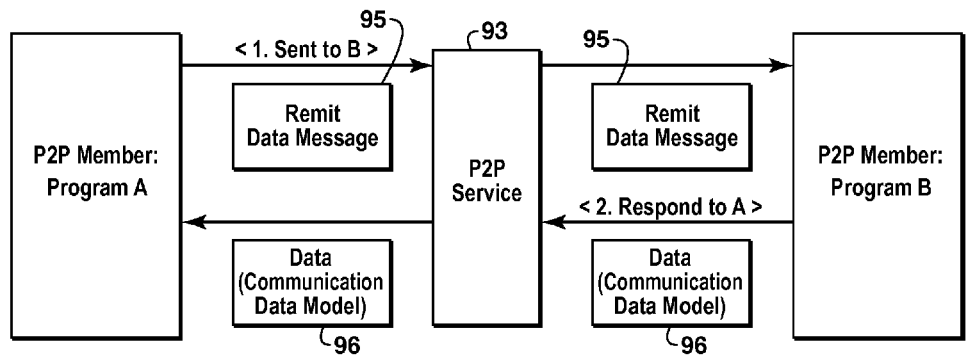

FIG. 9A shows computer program A, which is a P2P member, sending the standard XML message 'RemitAvailableData' 92 to computer program B, which is another P2P member. According to the principles disclosed herein, message 92 is sent to the P2P service 93, which routes the message to computer program B. Computer program B responds to message 92 by creating a catalogue of data it is willing to share with other P2P members. Computer program B sends a message 94 containing the data catalog back to computer program A (via P2P service 93), which can then use the data catalog to determine what data it would like to use. If computer program A wants any of the data in the data catalog, the computer program A sends to computer program B (via P2P service 93) the standard XML message 'RemitData' 95 containing the data catalogue entries computer program A wants to obtain (FIG. 9A). Computer program B examines the requested data catalogue entries and formats the corresponding data in the Common Data Model. Computer program B then sends the data objects 96, in the Common Data Model format, to computer program A.

P2P members can define their own action tags that other members can send to them to execute algorithms. A P2P member can define an action tag for any of its algorithms it is willing to expose to other members. Other P2P members would then be able to send an XML action tag to the P2P members to execute the corresponding algorithms. As these action tags are not standard to XML, they are predefined and made known among P2P members before P2P members can make use of them.

If a P2P member receives a message with an XML action tag it does not understand or recognize, the P2P member may avoid a crash of the process by either sending an error statement to the user or by ignoring the message. Likewise, if a P2P member receives a Common Data Model XML message referring to a Common Data Object that is not supported by the recipient, the recipient of the message may send an error statement to the user or ignore part or the entire corresponding action XML message depending on the type of action message.

As stated before, to act as a P2P member a computer program defines a mailbox (or other send/receive functionality) to receive P2P XML messages. The computer program should be able to handle the Common Data Model XML message, the RemitAvailableData message and the RemitData message previously mentioned, as well as any predefined action tags. If a computer program only intends to receive data from other members and to never share its data with other P2P members, the program may ignore the standard data sharing messages.

If a P2P member is designed to send data to other P2P members, the P2P member defines a Common Data Model adapter that translates data from the P2P member's native data format into the Common Data Model format. Data translator logic is defined for each type of domain object that the member is willing to share with other P2P members. When creating a data catalogue in response to the RemitAvailableData message, a P2P member includes entries for domain objects that the member can translate into the Common Data Model. When a P2P member receives a RemitAvailableData message it uses the specific data translators in its Common Data Model adapter to convert between its native data format to the Common Data Model format. The member then sends the requested data in the Common Data Model format.

If a P2P member is designed to receive data from other P2P members, it defines a Common Data Model adapter that will translate data from the Common Data Model format into the member's own native data format. Again, logic is defined for each type of domain object that the P2P member might request from other P2P members. If a P2P member might request data representing 'Employee' from another member, then it should be able to convert from the Common Data Object definition of an Employee to its own native format of an Employee.

If a P2P member plans to both send and receive data with other P2P members it will need to define two Common Data Model adapters—a send adapter and a receive adapter—as previously discussed. A P2P member is responsible for determining which types of domain objects it can share with other P2P members. The member catalogs entries of those domain object types when responding to a RemitAvailableData command. A member also determines which domain object types it can receive from other members.

A computer program associated with an open source computer application may be modified easily to act as a P2P member. Since the source code can be modified, logic for a P2P mailbox can be added into the computer application. The modified computer application can be re-deployed to computers running the associated computer program. The created mailbox enables the computer program to receive messages from other P2P members. Common Data Model adapters may also be created to send and receive data depending on how much functionality is desired. Computer programmers might also create and enable any P2P XML action tags the P2P member might expose to other members.

Figure 10:
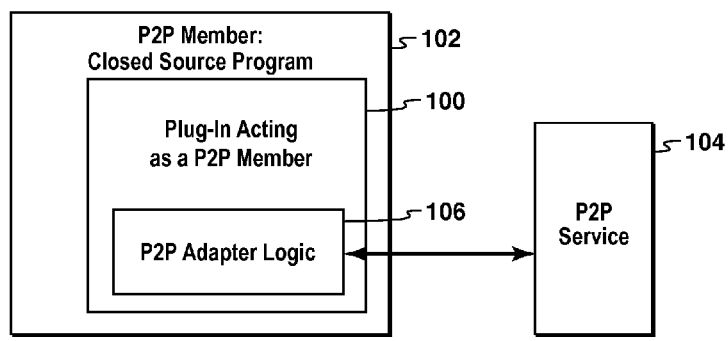
FIG. 10 is a block diagram of a closed-source computer program communicating with the P2P service.
Figure 11:
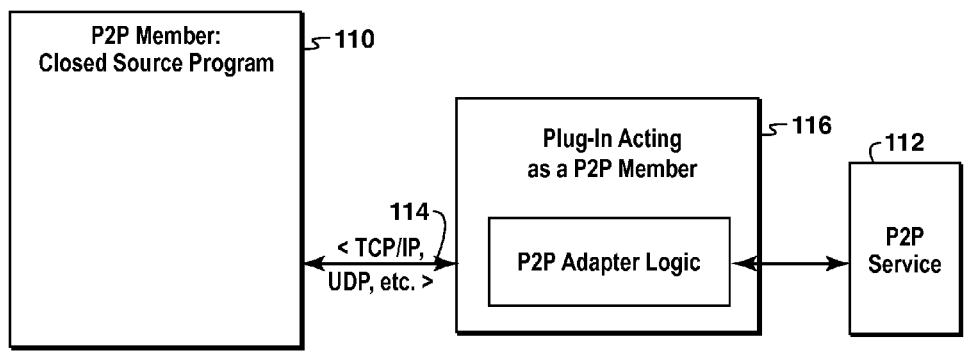
FIG. 11 is a block diagram of a closed-source computer program

It is also possible to make a closed-source computer application conform to the P2P service requirements of membership. This may be done when the closed-source application has some type of mechanism that facilitates programmatic control of the application. For example, some computer applications allow the use of plug-ins that can be run as part of the associated computer program. A plug-in could be written containing the P2P logic that handles various P2P XML messages. As shown in FIG. 10, a plug-in 100 operationally connected to a closed-source program 102 interacts with a P2P service 104 through P2P adapter logic 106 contained in the plug-in. The plug-in acts as the P2P member while communicating with the logic and data of the closed-source program. FIG. 11 shows another method of connecting a closed-source computer program 110 to a P2P service 112. If the closed-source computer program permits programmatic control over itself via scripting languages or commands that are sent to the program over a network communication protocol such as TCP/IP 114, a liaison member computer program 116 may be established that acts as the P2P member associated with closed-source computer program. The liaison member computer program 116 would be responsible for receiving P2P messages from the P2P service 112 and passing along commands to its associated closed-source computer program 110 via the scripting language or via TCP/IP messages. Network communication protocols 114 may enable communication between programs on different physical computers, as shown in FIG. 11, as well as between programs on the same computer.

Figure 12:
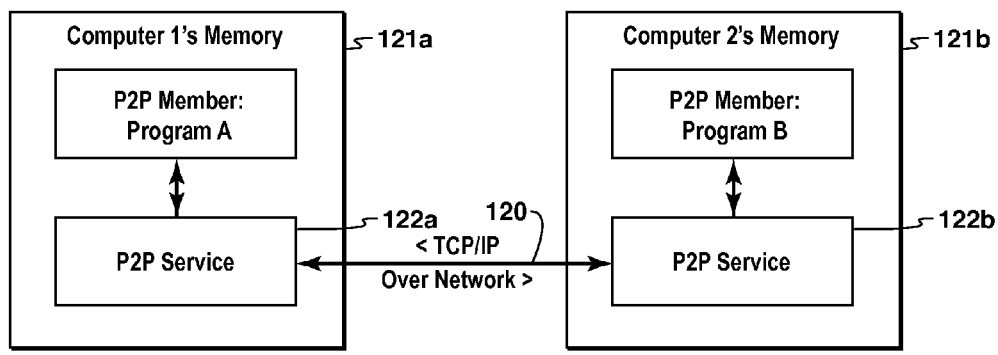
FIG. 12 is a block diagram of computer programs running on separate computers.

As previously mentioned the P2P service leverages the standard TCP/IP computer network communication protocol as well as file sharing concepts for sending messages between P2P members. The actual implementation based on TCP/IP and file sharing is not relevant and could be replaced with known or newer mechanisms such as the Windows communication foundation. The actual communication between P2P members can take place on a single computer or across different computers on the same network. The P2P service can arrange communication between P2P members on the same computer or on different computers. Since the integration environment is built on top of the P2P service the integration environment can integrate computer programs executing on the same machine or on different machines. FIG. 12 shows how a communication protocol 120 such as TCP/IP may be used to integrate computer program A, residing in the memory 121a of computer 1, with program B, residing in the memory 121b of computer 2. Each program is connected to a P2P service 122a, 122b that resides respectively in the memory of computers 1 and 2.

As previously mentioned, the integration environment facilitates real time computer program data sharing and algorithm execution. The integration environment leverages both the Common Data Model and the P2P service to achieve these goals. Individual computer programs that participate in the integration environment act as P2P members for all necessary communication. If participating programs send or receive data they use the P2P XML messages previously described.

Uniform Resource Identifier (URI)

Figure 13:
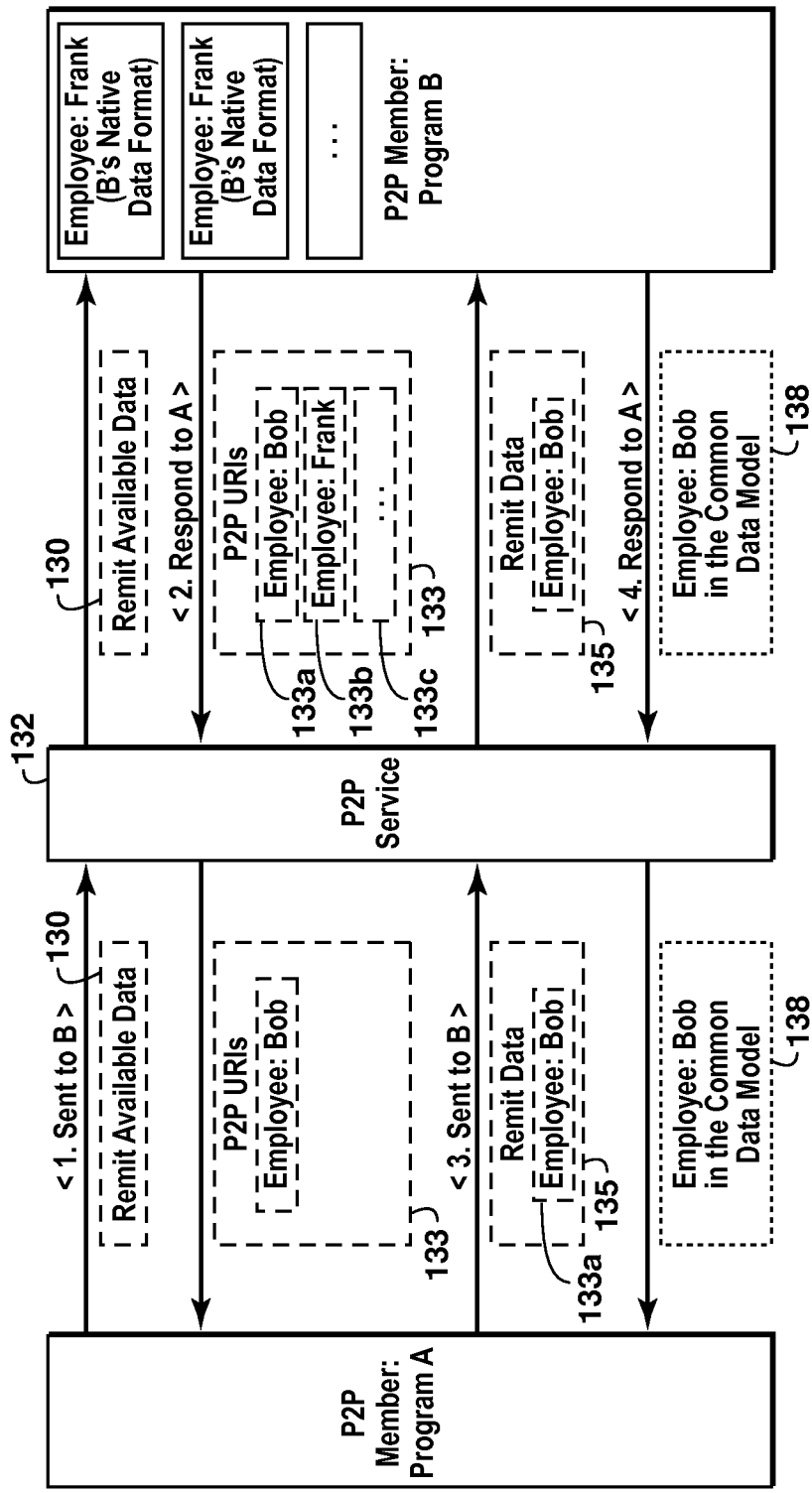
FIG. 13 is a block diagram of two computer programs communicating using the P2P service.
Figure 14:
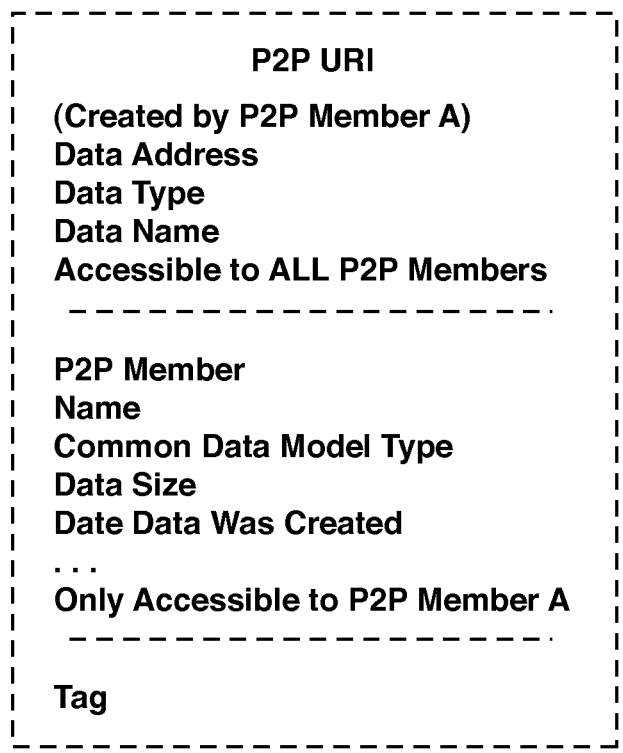
FIG. 14 is a block diagram of a uniform resource identifier (URI)

A Uniform Resource Identifier (URI) is the data address P2P members use to reference, request and transfer data between themselves. Each piece of data held by a P2P member can be identified uniquely with this addressing construct. FIG. 13 shows how URIs are used in the context of a RemitAvailableData P2P message 130 sent from computer program A to computer program B through the P2P service 132. When computer program B receives the RemitAvailableData message 130, it responds by supplying a data catalog 133 that contains a set of URIs 133a, 133b, 133c. As shown in FIG. 14, each URI contains information identifying its corresponding P2P member, its data address, and the type of data the URI addresses. This identifying information may be in the Common Data Model format. A URI may contain additional information, such as the data's name, the date the data was created, the data size, the Common Data Model type (if more than one Common Data Model type is being used or is available), and other information helpful to identify or describe the data in the URI. In some situations, a P2P member could use this additional information to decide whether the data should be requested.

Returning to FIG. 13, when computer program A receives a URI that specifies a data address of an employee or employees in the common data format that resides in the computer program B, computer program A could decide if it wanted to request from computer program B the data relating to one or more of the employees. Computer program A may check the data type of the desired URI to ensure the data is in a common data format, or at least in a data format computer program A can understand. If the data is desired, computer program A creates a RemitData message 135 to request the addressed data. Computer program A inserts the URI associated with the desired data (in this example, URI 133a) into the RemitData message, and sends the message to computer program B via the P2P service 132. When it does so, computer program A may not know it is communicating with computer program B. Computer program A may only know it is to transmit a request for specified data to another P2P member via the P2P service. The P2P service identified the specified P2P member, which in this instance is computer program B. Computer program B then receives the RemitData message and locates the corresponding employee data referenced by the URI packaged inside of the RemitData command. As the employee data may be stored in computer program B's native data format, computer program B converts the employee data into the common data object format that has been defined for employee data. Computer program B sends a response 138 via the P2P service 132 to the P2P member that originated the request (computer program A), with the employee data in the common data object format. Computer program A receives the response 138 and converts the employee data from the common data object format to computer program A's native data format.

The above example illustrates how the P2P service and the common data model facilitate real-time, efficient, generic and flexible algorithmic execution and data sharing between different computer programs. The compactness of the URI guarantees efficiency. Using these processes, only the minimum amount of information is communicated between computer programs until actual data is needed. Communication is generic because computer programs only know they are communicating with other P2P service members, and do not know any specific details about other computer programs that are P2P members. Communication is flexible because most computer programs can participate in this environment. As previously mentioned, most applications can be extended or modified to act as a P2P member.

Integrated Workflow Builder (IWB)

The Integrated Workflow Builder is a computer program providing an integration environment using the Common Data Model, P2P, and the URI. The IWB is not a service like P2P and is not always available on a computer. The IWB can be launched and terminated as with other computer programs. The IWB has a graphical user interface for user interaction. The IWB communicates with the P2P service as a member like other computer programs do.

The IWB may be used to design and run workflows. A user may open the IWB as a new program, design a workflow, and run the workflow. Tools are the building blocks of IWB workflows. A P2P member may define an IWB Tool for every P2P action tag or message the member has defined. The tool itself resides in the IWB computer program. When a tool is executed it will pass a P2P action tag to the P2P member for which the tool has been defined. A tool isn't restricted to using a single P2P message when it executes, but could send several P2P messages to the tool's corresponding P2P member. Referring to the previous discussion of a P2P XML action tag, if a computer program defined a P2P message called 'PayEmployee', the computer program could also define an IWB tool called 'PayEmployee'. The PayEmployee tool would live inside the IWB program in the workflow. When a user runs the workflow, the PayEmployee tool sends the 'PayEmployee' message via P2P to the computer program A for execution.

Tools are designed to operate with a specific computer program. Tools can only communicate with a specific program of the correct application type. When a user designs a workflow, one or more tools are selected from a toolbox displayed to the user, and icons representing each selected tool are generated in the design space. When a tool is selected, it will search each of the P2P members that exist in the P2P service and will link or associate itself automatically to the first available P2P member that is of the correct application type. Alternatively, the user can select from a list of P2P members of the correct type. The tool may communicate with its corresponding P2P member while the user is designing the workflow. The tool communicates with its corresponding P2P member when the tool executes. If a tool is not connected to its corresponding P2P member it will not be able to execute, and the workflow will fail.

Figure 15:
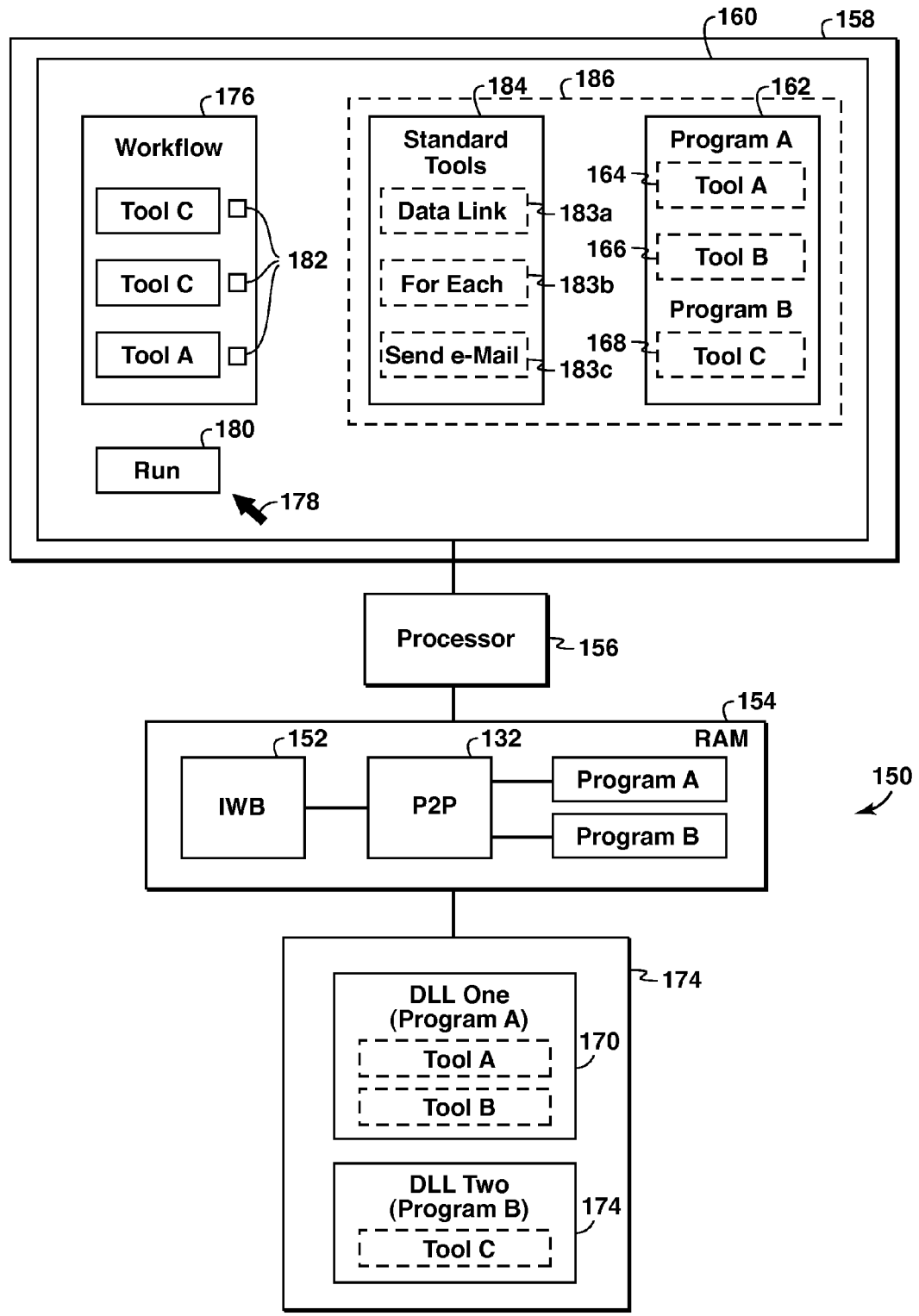
FIG. 15 is a block diagram of a computer system using the integrated workflow builder (IWB)

FIG. 15 is a block diagram of a computer system 150 having the IWB computer program 152 running on its random access memory (RAM) 154. IWB computer program 152 is shown as interacting with the P2P service 132, which in turn communicates with computer programs A and B. RAM 154 is connected to processor 156, which in turn is connected to a display 158. Processor 156 is directed by IWB computer program 152 to render an IWB graphical user interface 160 on display 158. The IWB graphical user interface includes a first toolbox portion 162 where tools 164, 166, 168 specific to various computer programs are displayed. These tools may be loaded into the IWB program when the IWB program starts via dynamically linked libraries (DLLs) 170, 172. DLLs are standard files that contain pieces of logic and are typically stored in a long-term memory associated with the computer system. In FIG. 15 the DLLs are stored in a hard drive 174. When the IWB program begins, it searches a few predetermined directories in the hard drive (or in the memory of the computer) for any DLLs containing tools. The tools discovered therein are extracted and made available to users to design workflows via the first toolbox portion 162. Each computer program that is a P2P member will have a unique set of tools. The first toolbox portion may display each computer program's corresponding tools in a unique section therein, as shown in FIG. 15.

The IWB graphical user interface 160 includes a workflow design space 176 that is used to define which tools will execute and in what order. The tools, which are displayed in first toolbox 162, may be selected using 'drag and drop' techniques with a cursor element 178, for example, and placed into the workflow design space. A tool shown in the toolbox can be selected and used multiple times throughout the same workflow as desired. As with other computer programs or documents, a workflow can be saved to non-volatile data storage (such as a computer's hard drive) and be retrieved for later editing. Workflows may be saved in user-readable text files in an XML format. Users can share workflows just like any normal document. A workflow will run successfully on another computer if all tools (stored in DLLs, for example) are available on the other computer.

To execute a workflow, a 'Run' button 180 may be provided on the IWB graphical user interface 160. This causes each tool in the workflow to be executed or run in the order that the user defined when designing the workflow. The display of the workflow may show the progress of the execution of each tool in the workflow by using status boxes 182 associated with each selected tool in the workflow. When each tool executes it sends a message via P2P to the computer program with which the tool is associated. If a tool loses the connection to its associated computer program, the tool will not be able to execute and the workflow execution will fail. The user may be notified in the IWB's graphical user interface. Each P2P member affected by an executing workflow should stay connected to the P2P Service.

Although tools generally are associated with specific computer programs, the IWB application may come with standard tools for iterating large sets of data and for sharing data. As shown in FIG. 15, example standard tools 183*a*, 183*b*, 183*c* always show up in a second toolbox portion 184 of the IWB toolbox 186. Users can mix and match the standard tools with the custom tools in a workflow to orchestrate how heterogeneous applications should run together. The IWB program allows users to aggregate several heterogeneous applications into one run-time instruction set.

The standard IWB tool for sharing data between P2P members is called the DataLinkTool 183*a*, which is used to create a CustomDataLinkTool that is specific to a P2P-enabled application. For example, if it is desired to enable computer program A to share data with another P2P member via the IWB, code would be added to the standard DataLinkTool 183*a* to create a CustomDataLinkTool specific to computer program A.

Figure 16:
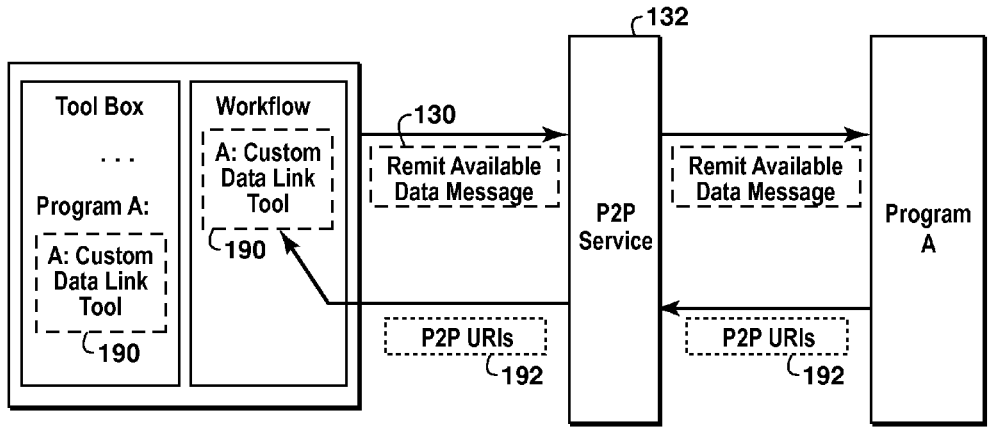
FIG. 16 is a block diagram of the IWB communicating with a first computer program.
Figure 17:
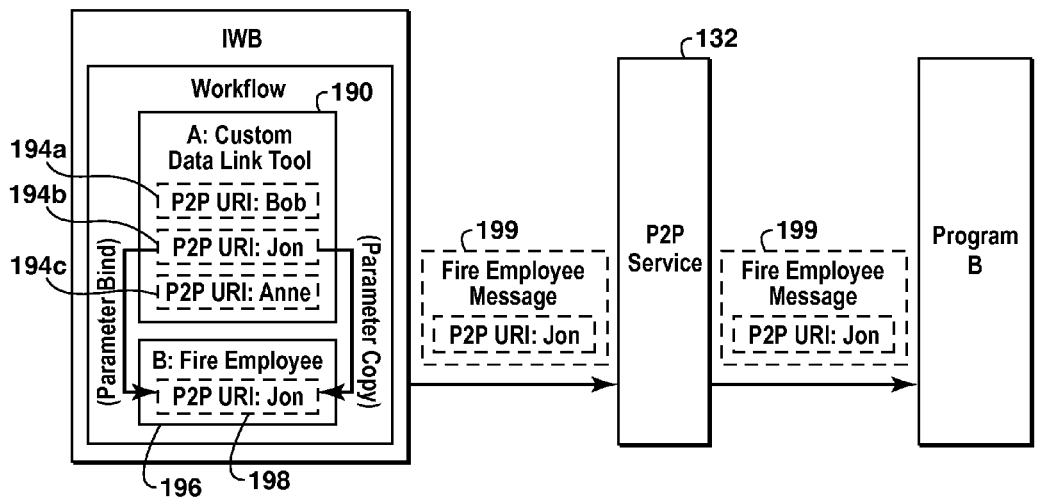
FIG. 17 is a block diagram of the IWB communicating with a second computer program.
Figure 18:
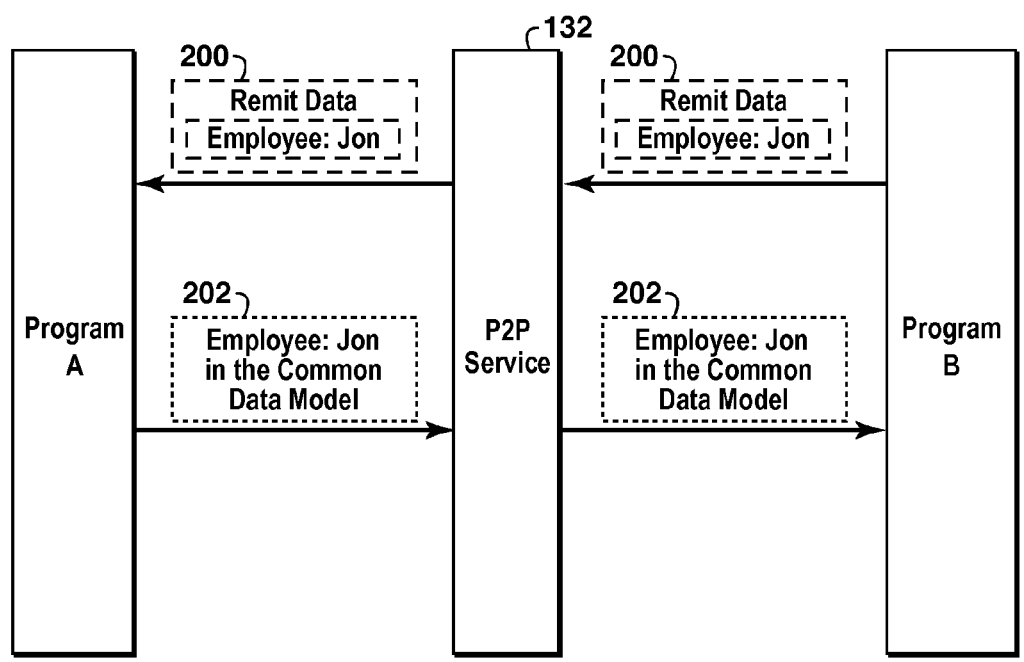
FIG. 18 is a block diagram of the first computer program communicating with the second computer program.

FIG. 16 shows an example of how the CustomDataLinkTool works. A CustomDataLinkTool 190 created for computer program A uses the RemitAvailableData P2P message 130 that was described with reference to FIG. 13. The CustomDataLinkTool 190 sends the RemitAvailableData command, through the P2P service 132, to the P2P member with which the tool is associated (i.e., computer program A). The CustomDataLinkTool will then receive a set of URIs from computer program A representing the data that computer program A currently has. This communication occurs while the workflow is being designed, and before the workflow is executed. The received URIs are then displayed in the IWB graphical user interface (in the workflow or in the toolbox?) as parameters of the CustomDataLink tool. For example, if in FIG. 16 three URIs representing the Common Data Model type 'Employee' were received, three corresponding tool parameters 194*a*, 194*b*, 194*c* may be displayed, which in FIG. 17 are labeled 'Bob', 'Jon' and 'Anne'. One or more of the received parameters can then be bound, or connected to, another tool's input. Parameter binding is the mechanism that allows tools to share data and is how the IWB integrates applications together. Specifically, it ties together the data from several tools executing in the IWB. Parameter binding is possible between any of the tools in the IWB, not just from DataLink tools. Parameter binding is also 'type safe' meaning that the IWB does not permit different types of parameters to be connected together. For example, in a hydrocarbon reservoir simulation, the IWB would not permit data representing a geologic fault to be input into an application where data representing a well is required. The IWB constrains potential parameter bindings to parameters that are truly run-time safe. In FIG. 17 the 'FireEmployee' tool 196, associated with computer program B, has a parameter 198 called 'input'. A user may perform a parameter bind to the $2^{nd}$ URI (194*b*), named 'Jon', that is associated with the CustomDataLinkTool 190. When the workflow is executed the URI with value 'Jon' 194*b* may be copied from the CustomDataLinkTool 190 to the FireEmployee Tool 196. This copying is due to the parameter bind performed between the two tools while the workflow was being designed. After the parameter has been copied to the FireEmployee tool 196 the FireEmployee tool packages and sends a FireEmployee P2P message 199 that contains the P2P URI for 'Jon'. Computer program B receives this message through the P2P service 132. When computer program B receives message 199 it will then use the P2P URI for 'Jon' and send a RemitData message 200 to computer program A to retrieve the data for Jon (FIG. 18). The data message 202 sent by computer program A in response to message 200 may be in the Common Data Model format. Computer program B then converts the data in data message 202 from the Common Data Model format into computer program B's native data format and proceeds to execute the operation corresponding to the 'FireEmployee' message.

Figure 19:
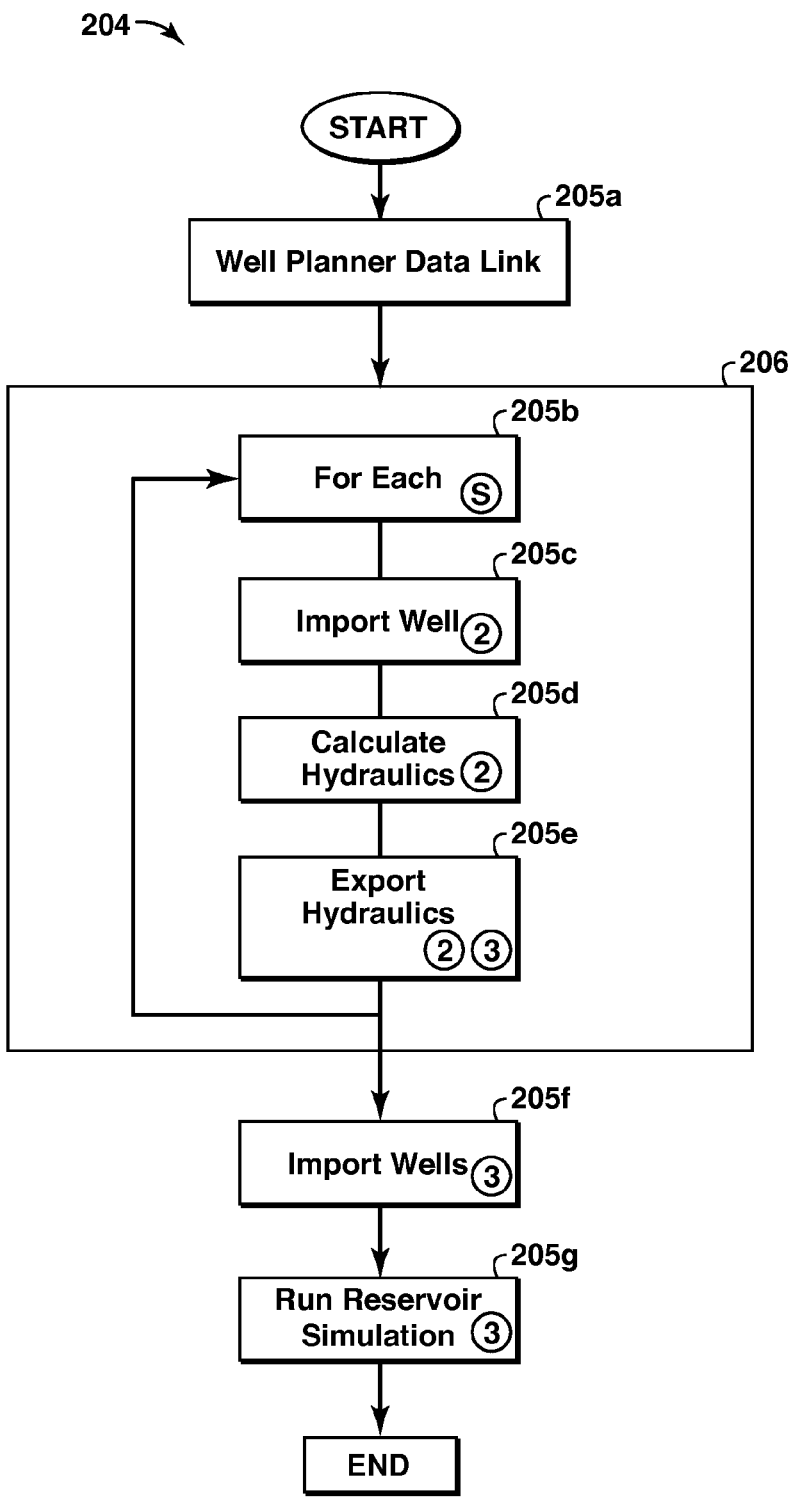
FIG. 19 is a workflow built with the IWB.

The Integrated Workflow Builder may be used to direct the execution of multiple computer programs in activities related to hydrocarbon management. FIG. 19 depicts a hydrocarbon reservoir simulation-related IWB workflow 204, as displayed in a workflow design space. Each icon 205*a*-205*g* in FIG. 19 represents a tool selected from a toolbox and placed on the workflow design space by a user. As previously explained, each tool represents an instruction to its associated computer program to import data, export data, or perform some other function. Each icon 205*a*-205*g* includes a circled number or letter indicating which computer program the icon and tool is associated with ("s" signifying an icon associated with standard tools). As shown in FIG. 15, a toolbox 186 may include icons representing various tools. The tools may be organized in the toolbox according to the computer program with which they are associated. The icon representing a well planner data link 205*a* may be selected from a portion of a displayed toolbox associated with a first computer program that selects well placement and trajectories. When executed, the first computer program outputs well placement and trajectory data into a loop 206 that calculates hydraulic data for each well outputted therein. The loop 206 is actuated using a standard "For Each" tool associated with icon 205*b*, which the user may select from a portion of the toolbox associated with standard IWB tools. The hydraulic data is calculated using a second computer program, which (a) acquires well placement and trajectory data using a tool associated with the "Import Well" icon 205*c*, (b) calculates the hydraulic data using a tool associated with the "Calculate Hydraulics" icon 205*d*, and (c) exports the hydraulic data using a tool associated with the "Export Hydraulics" icon 205*e*. Icons 205*c*, 205*d* and 205*e* may be selected from a portion of the displayed toolbox associated with the second computer program. The tool associated with the "Import Wells" icon 205*f* imports well placement and trajectory data from the first computer program into a computer program that performs reservoir simulation. Icon 205*f* may be selected from a portion of the displayed toolbox associated with the reservoir simulation program. Using the well placement and trajectory data and the hydraulic data as inputs, the reservoir simulation program runs one or more reservoir simulations by executing a tool associated with the "Run Reservoir Simulation" icon 205*g*. The Icon 205*g* may be selected from the portion of the toolbox associated with the reservoir simulation program. Using IWB workflow 204 (and the associated components of the Integrated Workflow Builder as disclosed herein), a user may combine the functionality of the first computer program, the second computer program, and the reservoir simulation program in a seamless manner that saves time and expense. The reservoir simulation program may provide inputs to other computer programs, or the other computer programs may provide inputs to the reservoir simulation program as desired.

The IWB may be used in other hydrocarbon management activities, such as enabling the automation of assisted history matching workflows, calculating field or regional cost/benefit analyses based on updated geologic/simulation model results, automating the generation of connectivity analysis results from multiple sources, automating the processing of model and/or seismic properties and/or attributes using one or more P2P enabled application, generating summary reports using input from one or more P2P enabled application, automating the simulation of multiple scenarios, and any other hydrocarbon management activity where outputs of one computer program may be used as inputs to another computer program. Example inputs and/or outputs to these programs may include well placement data, well trajectory data, hydraulic pressure, model geometry, model properties, geometric data, surfaces, seismic, financial data, and reservoir simulation data.

Figure 20:
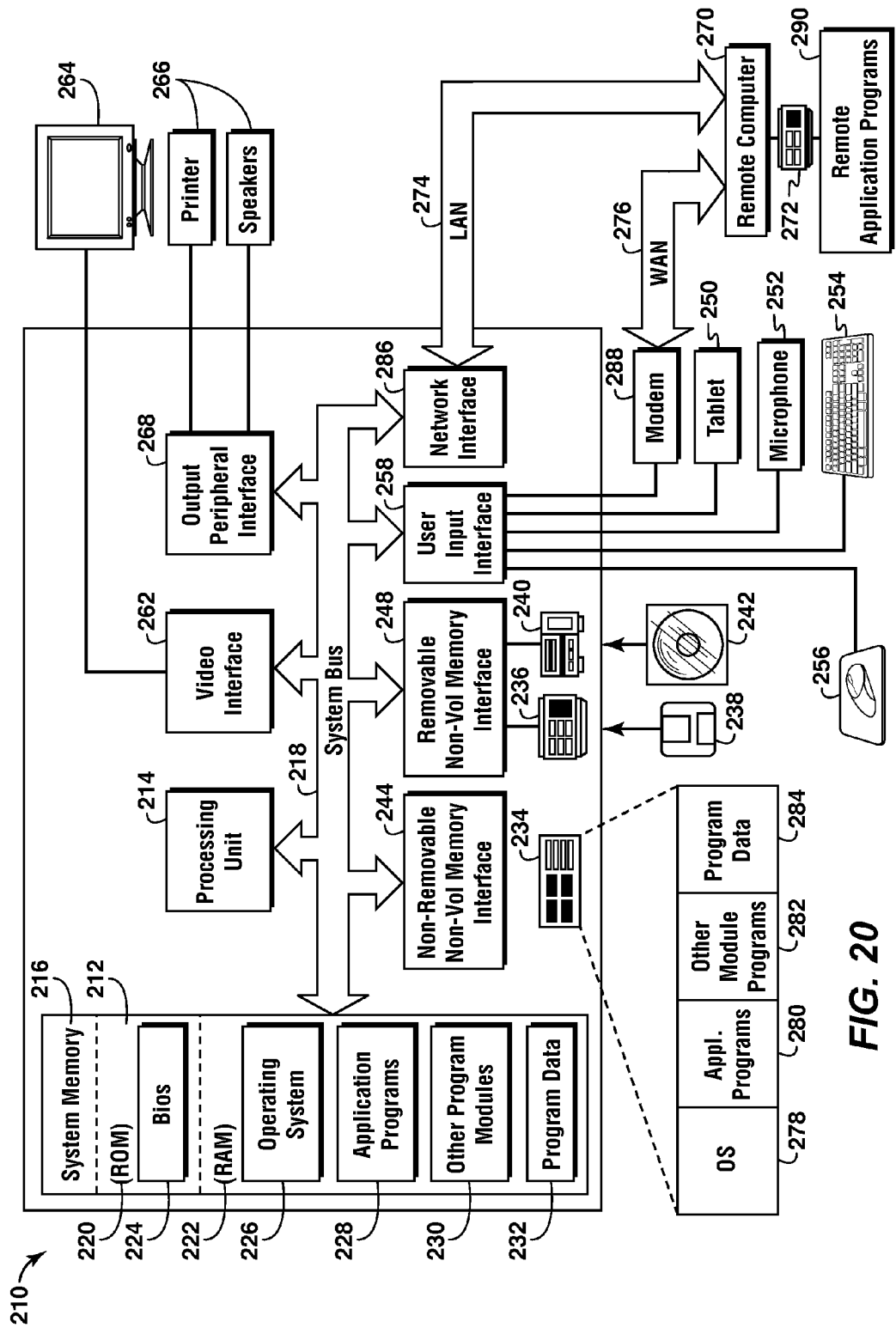
FIG. 20 is a block diagram of a computer system.

The disclosure has provided various examples of computer systems or portions thereof. A more complete illustration of a system for implementing aspects of the disclosed methodologies and techniques is depicted in FIG. 20, it being understood that aspects previously disclosed may be incorporated into part or all of the system in FIG. 20. The system includes a computing device in the form of a computing system 210, which may be a UNIX-based workstation or a commercially available system from Intel, IBM, AMD, Motorola, Cyrix and/or others. Components of the computing system 210 may include, but are not limited to, a processing unit 214, a system memory 216, and a system bus 246 that couples various system components including the system memory to the processing unit 214. The system bus 246 may be any of several types of bus structures including a memory bus or memory controller, a peripheral bus, and a local bus using any of a variety of bus architectures.

Computing system 210 typically includes a variety of computer readable media. Computer readable media may be any available media that may be accessed by the computing system 210 and includes both volatile and nonvolatile media, and removable and non-removable media. By way of example, and not limitation, computer readable media may comprise computer storage media and communication media. Computer storage media includes volatile and nonvolatile, removable and non removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computing system 210.

The system memory 216 includes computer storage media in the form of volatile and/or nonvolatile memory such as read only memory (ROM) 220 and random access memory (RAM) 222. A basic input/output system 224 (BIOS), containing the basic routines that help to transfer information between elements within computing system 210, such as during start-up, is typically stored in ROM 220. RAM 222 typically contains data and/or program modules that are immediately accessible to and/or presently being operated on by processing unit 214. By way of example, and not limitation, FIG. 20 illustrates operating system 226, application programs 230, other program modules 230 and program data 232.

Computing system 210 may also include other removable/non-removable, volatile/nonvolatile computer storage media. By way of example only, FIG. 20 illustrates a hard disk drive 234 that reads from or writes to non-removable, nonvolatile magnetic media, a magnetic disk drive 236 that reads from or writes to a removable, nonvolatile magnetic disk 238, and an optical disk drive 240 that reads from or writes to a removable, nonvolatile optical disk 242 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 234 is typically connected to the system bus 246 through a non-removable memory interface such as interface 244, and magnetic disk drive 236 and optical disk drive 240 are typically connected to the system bus 246 by a removable memory interface, such as interface 248.

The drives and their associated computer storage media, discussed above and illustrated in FIG. 20, provide storage of computer readable instructions, data structures, program modules and other data for the computing system 210. In FIG. 20, for example, hard disk drive 234 is illustrated as storing operating system 278, application programs 280, other program modules 282 and program data 284. These components may either be the same as or different from operating system 226, application programs 230, other program modules 230, and program data 232. Operating system 278, application programs 280, other program modules 282, and program data 284 are given different numbers hereto illustrates that, at a minimum, they are different copies.

A user may enter commands and information into the computing system 210 through input devices such as a tablet, or electronic digitizer, 250, a microphone 252, a keyboard 254, and pointing device 256, commonly referred to as a mouse, trackball, or touch pad. These and other input devices often may be connected to the processing unit 214 through a user input interface 258 that is coupled to the system bus 218, but may be connected by other interface and bus structures, such as a parallel port, game port or a universal serial bus (USB).

A monitor 260 or other type of display device may be also connected to the system bus 218 via an interface, such as a video interface 262. The monitor 260 may be integrated with a touch-screen panel or the like. The monitor and/or touch screen panel may be physically coupled to a housing in which the computing system 210 is incorporated, such as in a tablet-type personal computer. In addition, computers such as the computing system 210 may also include other peripheral output devices such as speakers 264 and printer 266, which may be connected through an output peripheral interface 268 or the like.

Computing system 210 may operate in a networked environment using logical connections to one or more remote computers, such as a remote computing system 270. The remote computing system 270 may be a personal computer, a server, a router, a network PC, a peer device or other common network node, and typically includes many or all of the elements described above relative to the computing system 210, although only a memory storage device 272 has been illustrated in FIG. 20. The logical connections depicted in FIG. 20 include a local area network (LAN) 274 connecting through network interface 286 and a wide area network (WAN) 276 connecting via modem 288, but may also include other networks. Such networking environments are commonplace in offices, enterprise-wide computer networks, intranets and the Internet.

For example, computer system 210 may comprise the source machine from which data is being migrated, and the remote computing system 270 may comprise the destination machine. Note however that source and destination machines need not be connected by a network or any other means, but instead, data may be migrated via any machine-readable media capable of being written by the source platform and read by the destination platform or platforms.

The central processor operating system or systems may reside at a central location or distributed locations (i.e., mirrored or stand-alone). Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. For example, a storage medium may be coupled to the processor such that the processor may read information from, and write information to, the storage medium. In the alternative, the storage medium may be integral to the processor. The processor and the storage medium may also reside in an application-specific integrated circuit (ASIC). The bus may be an optical or conventional bus operating pursuant to various protocols that are well known in the art. One system that may be used is a Linux workstation configuration with a Linux 64-bit or 32-bit Red Hat Linux WS3 operating system, and an NVIDIA Quadro graphics card. However, the system may operate on a wide variety of hardware.

Figure 21:
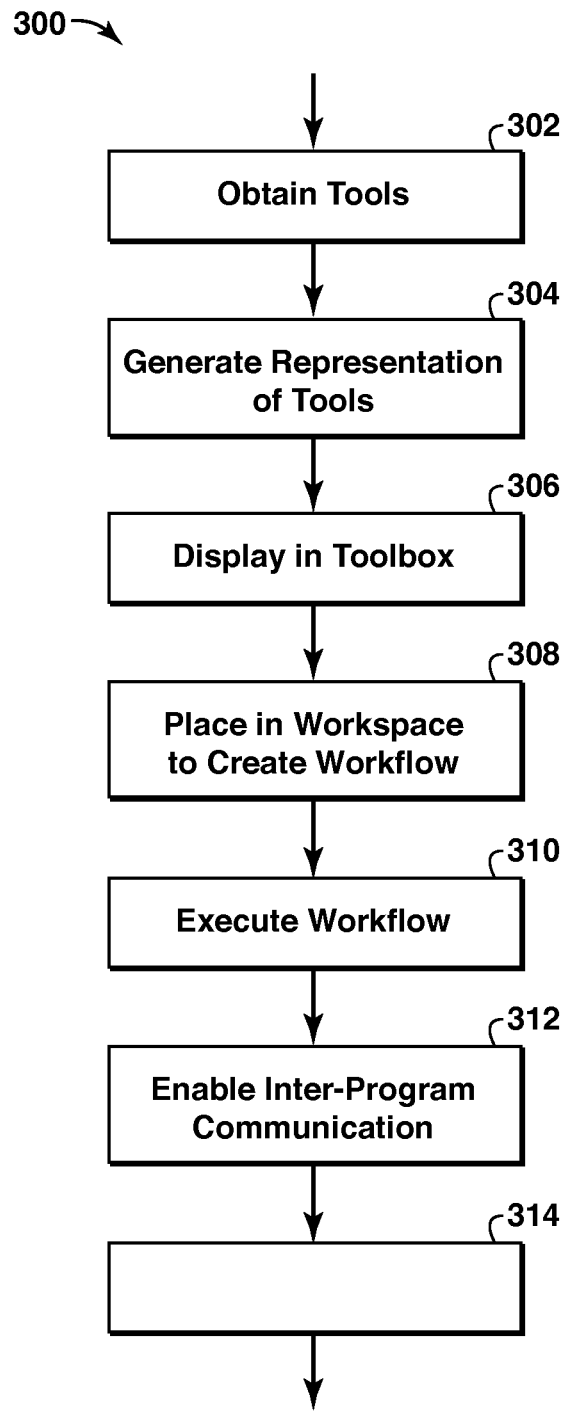
FIG. 21 is a block diagram of a representation of machine-readable code according to disclosed aspects.

FIG. 21 is a block diagram of a representation of machine-readable code 300 that may be used with a computing system such as computing system 210. At block 302, code is provided for obtaining at least one tool associated with a first computer program and at least one tool associated with a second computer program. Each tool represents a functionality of the computer program with which it is associated. The first and second computer programs have non-identical data formats and are configured to perform hydrocarbon management activities. At block 304, code is provided for generating a representation of the at least one tool associated with the first computer program and the at least one tool associated with the second computer program. At block 306, code is provided for displaying the generated representations in a toolbox. At block 308, code is provided for placing selected displayed representations in a displayed workspace to establish a graphical representation of a workflow. Displayed representations from more than one computer program are selected, and the displayed representations are positioned in the graphical representation of the workflow in a sequence corresponding to a desired workflow sequence. At block 310, code is provided for executing the workflow according to the desired workflow sequence. At block 312, code is provided for enabling inter-program communications between the first and second computer programs to enable the workflow to execute such that messages and data are transferred between the first and second computer programs in a common data format. Code effectuating or executing other features of the disclosed aspects and methodologies may be provided as well. This additional code is represented in FIG. 21 as block 314, and may be placed at any location within code 300 according to computer code programming techniques.

Figure 22:
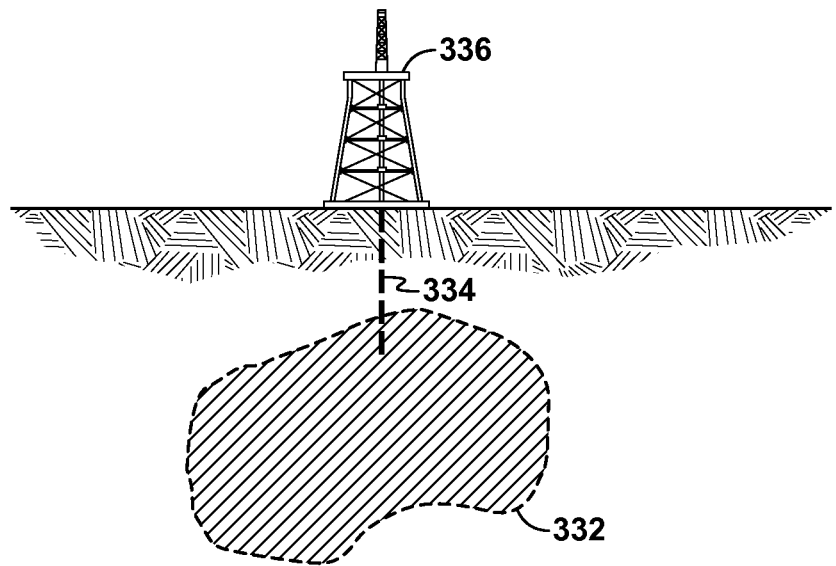
FIG. 22 is a side elevational view of a subsurface region and hydrocarbon-extraction equipment.
Figure 23:
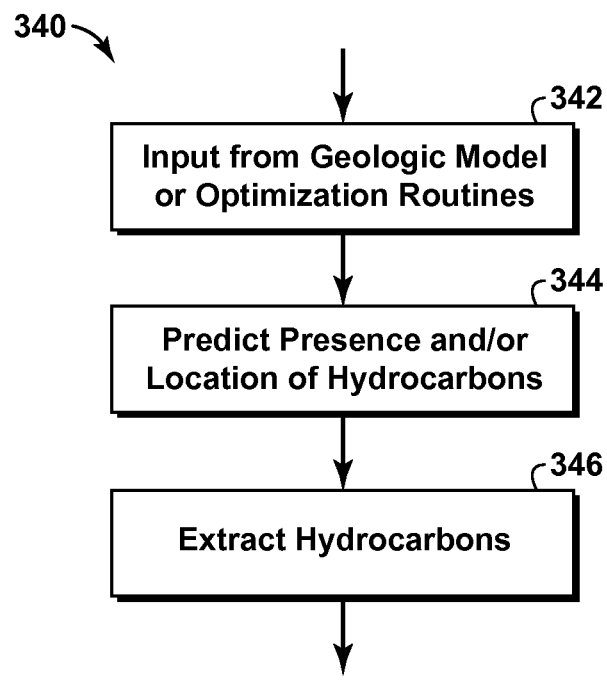
FIG. 23 is a flowchart of a method according to disclosed aspects.

Aspects disclosed herein may be used to perform hydrocarbon management activities such as extracting hydrocarbons from a subsurface region, which is indicated by reference number 332 in FIG. 22. A method 340 of extracting hydrocarbons from subsurface reservoir 332 is shown in FIG. 23. At block 342 inputs are received from a geologic model of the subsurface region, where the geologic model as been improved using the methods and aspects disclosed herein. At block 344 the presence and/or location of hydrocarbons in the subsurface region is predicted. At block 346 hydrocarbon extraction is conducted to remove hydrocarbons from the subsurface region, which may be accomplished by drilling a well 334 using oil drilling equipment 336 (FIG. 22). Other hydrocarbon management activities may be performed according to known principles.

Figure 24:
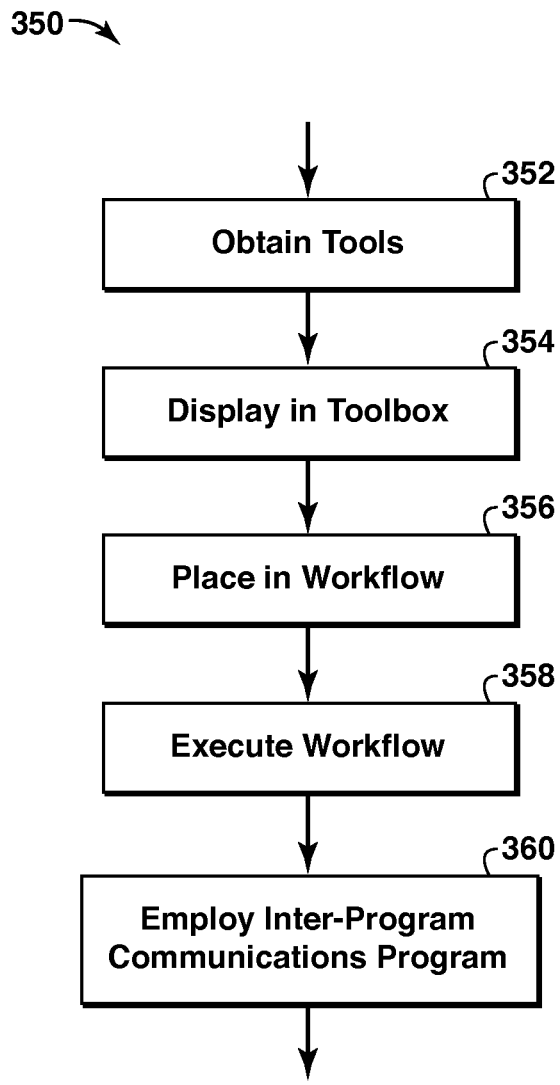
FIG. 24 is a flowchart of a method according to disclosed aspects.

FIG. 24 depicts a flowchart of a method 350 according to aspects of the disclosed methodologies and techniques. At block 352 at least one tool associated with a first computer program and at least one tool associated with a second computer program are obtained. Each tool represents a functionality of the computer program with which it is associated. The first and second computer programs may be configured to perform hydrocarbon management activities such as well location and trajectory planning, seismic signal processing, subsurface modeling, production planning, or the like. The first and second computer program have non-identical data formats. At block 354 a representation of each of the obtained tools is displayed in a toolbox. The representation may be an icon or other graphic symbol, a portion of text, a combination of graphics and text. The toolbox may be a region of a display from which a user may select tools to be included in a workflow. Tools common to or helpful to functionality of workflows may also be placed in the toolbox. At block 356 a plurality of the displayed representations are displayed such that they are placed in a displayed workspace to establish a graphical representation of a workflow. Icons/text representing tools from more than one computer program are selected. The icons/text are positioned in the graphical representation of the workflow in a sequence corresponding to the desired workflow sequence. At block 358 the workflow is executed according to the desired workflow sequence. The executed workflow may perform a hydrocarbon management activity or function as discussed herein. At block 360 a third computer program is employed to facilitate inter-program communications between the first and second computer program to enable the workflow to execute. The third computer program may be the P2P program as described herein. The third computer program transfers messages and data between the first and second computer programs in a common data format.

The disclosed embodiments and methodologies may be susceptible to various modifications and alternative forms and have been shown only by way of example. The disclosed embodiments and methodologies are not intended to be limited to the particular embodiments disclosed herein, but includes all alternatives, modifications, and equivalents falling within the spirit and scope of the appended claims.

What is claimed is:

1. A method of communicating between a first computer program and a second computer program, wherein the first and second computer programs are configured to perform hydrocarbon management activities and have non-identical data formats, the method comprising:
   obtaining at least one tool associated with the first computer program and at least one tool associated with the second computer program, wherein each tool represents a functionality of the computer program with which it is associated;
   displaying, in a toolbox, a representation of the at least one tool associated with the first computer program and the at least one tool associated with the second computer program;
   selecting a plurality of the displayed representations such that the displayed representations are placed in a displayed workspace to establish a graphical representation of a workflow, wherein displayed representations from more than one computer program are selected, and wherein the displayed representations are positioned in the graphical representation of the workflow in a sequence corresponding to a desired workflow sequence;
   executing the workflow according to the desired workflow sequence; and
   employing a third computer program to facilitate inter-program communications between the first and second computer programs to enable the workflow to execute, wherein the third computer program transfers messages and data between the first and second computer programs in a common data format.

2. The method of claim 1, wherein the first and second computer programs communicate with each other through the third computer program using messages that include an action portion and a data portion.

3. The method of claim 1, wherein the first and second computer programs communicate anonymously through the third computer program.

4. The method of claim 1, wherein the first computer program translates data from its native data format to the common data format before sending the data to the second computer program, and wherein the first computer program translates received data from the common data format to its native data format.

5. The method of claim 4, wherein at least one of the first computer program and the second computer program uses a plug-in to translate the data from its respective data format to the common data format or from the common data format to its respective native data format.

6. The method of claim 1, wherein the first computer program, the second computer program, and the third computer program are executed on a single computer.

7. The method of claim 1, wherein the first computer program is executed on a computer that is different from a computer on which at least one of the second and third computer programs are executed.

8. The method of claim 1, further comprising:
displaying a representation of a common tool in the toolbox, wherein the common tool is associated with functionality that is not unique to the first computer program or the second computer program, and wherein the representation of the common tool is configured to be selected and positioned in the graphical representation of the workflow.

9. The method of claim 1, wherein the representation of at least one tool includes a graphical icon.

10. The method of claim 1, wherein the representation of at least one tool includes text.

11. The method of claim 1, wherein the first computer program is a reservoir simulation program, and wherein the second computer program has an output that is used as an input to the reservoir simulation program.

12. The method of claim 11, wherein the output is at least one of well placement data, well trajectory data, hydraulic pressure, model geometry, model properties, geometric data, surfaces, seismic, and financial data.

13. The method of claim 1, wherein the first computer program is a reservoir simulation program having an output that is used as an input to the second computer program.

14. A method of communicating between a plurality of computer programs, wherein each of the plurality of computer programs are configured to perform hydrocarbon management activities, the method comprising:
obtaining at least one tool associated with each of the plurality of computer programs, wherein each tool represents a functionality of the computer program with which it is associated;
displaying, in a toolbox, a representation of the at least one tool associated with each of the plurality of computer programs;
selecting a plurality of the displayed representations such that the displayed representations are placed in a displayed workspace to establish a graphical representation of a workflow, wherein displayed representations from more than one of the plurality of computer programs are selected, and wherein the displayed representations are positioned in the graphical representation of the workflow in a sequence corresponding to a desired workflow sequence;
executing the workflow according to the desired workflow sequence; and
facilitating inter-program communications between any of the plurality of computer programs to enable the workflow to execute, wherein the facilitating is performed by transferring messages between the computer programs in a common data format.

15. The method of claim 14, wherein facilitating inter-program communications is accomplished using an inter-program communications computer program.

16. The method of claim 14, further comprising:
displaying a representation of a common tool in the toolbox, wherein the common tool is associated with functionality that is not unique to any of the plurality of computer programs, and wherein the representation of the common tool is configured to be selected and positioned in the graphical representation of the workflow.

17. The method of claim 14, wherein the representation of at least one tool includes at least one of a graphical icon and text.

18. The method of claim 14, wherein one of the plurality of computer programs is a reservoir simulation program, and wherein another of the plurality of computer programs receives an input from or sends an output to the reservoir simulation program.

19. The method of claim 18, wherein the input or output is at least one of well placement data, well trajectory data, hydraulic pressure, model geometry, model properties, geometric data, surfaces, seismic, reservoir simulation data, and financial data.

20. A computer program product having computer executable logic recorded on a non-transitory, tangible, machine readable medium, the computer program product comprising:
code for obtaining at least one tool associated with a first computer program and at least one tool associated with a second computer program, wherein each tool represents a functionality of the computer program with which it is associated, and wherein the first and second computer programs are configured to perform hydrocarbon management activities and have non-identical data formats;
code for generating a representation of the at least one tool associated with the first computer program and the at least one tool associated with the second computer program;
code for displaying the generated representations in a toolbox;
code for placing selected displayed representations in a displayed workspace to establish a graphical representation of a workflow, wherein displayed representations from more than one computer program are selected, and wherein the displayed representations are positioned in the graphical representation of the workflow in a sequence corresponding to a desired workflow sequence;
code for executing the workflow according to the desired workflow sequence; and
code for enabling inter-program communications between the first and second computer programs to enable the workflow to execute such that messages and data are transferred between the first and second computer programs in a common data format.

21. A method of hydrocarbon management, comprising:
accessing a first computer program that performs a hydrocarbon management activity, the first computer program having a first data format;

accessing a second computer program that performs a hydrocarbon management activity, the second computer program having a second data format;

obtaining at least one tool associated with the first computer program and at least one tool associated with the second computer program, wherein each tool represents a functionality of the computer program with which it is associated;

displaying, in a toolbox, a representation of the at least one tool associated with the first computer program and the at least one tool associated with the second computer program;

selecting a plurality of the displayed representations such that the displayed representations are placed in a displayed workspace to establish a graphical representation of a hydrocarbon management workflow, wherein displayed representations from more than one computer program are selected, and wherein the displayed representations are positioned in the graphical representation of the hydrocarbon management workflow in a sequence corresponding to a desired workflow sequence;

executing the hydrocarbon management workflow according to the desired workflow sequence;

employing a third computer program to enable inter-program communications between the first and second computer programs to enable the hydrocarbon-related workflow to execute, wherein the third computer program transfers messages and data between the first and second computer programs in a common data format; and managing hydrocarbons based on an output of the hydrocarbon management workflow.

\* \* \* \* \*